Aug. 23, 1966  G. E. Y. HOLMBERG  3,267,543
DEVICES FOR THE FASTENING OF STRAPS
Filed May 25, 1964

Inventor:
Åke Eskil Yngve Holmberg
By
Karin U. Flodes
Attorney

United States Patent Office 3,267,543
Patented August 23, 1966

3,267,543
DEVICES FOR THE FASTENING OF STRAPS
Göte Eskil Yngve Holmberg, Anderstorp, Sweden, assignor to G. E. Y. Patenter AB, Anderstorp, Sweden, a corporation of Sweden
Filed May 25, 1964, Ser. No. 369,690
Claims priority, application Sweden, Aug. 14, 1963, 8,883/63
1 Claim. (Cl. 24—196)

This invention relates to devices for the fastening of straps.

One type of strap fastening device comprises a tubular clamping member which is non-rotatable but slidably guided for movement in its transverse direction and in the ends of which there are disposed elements of plastic material which are inserted in the clamping member to form means for the operation of the clamping member with the fingers. This type of fastening devices has been widely used in fittings for safety seat belts in motor vehicles, and in such application of the device it has proved advantageous to give the clamping member an oval cross-sectional shape. The plastic elements forming the finger-operated means were attached only by press fit, a manner of attachment that has, however, proved less satisfactory. When the plastic elements are exposed to elevated temperature—in a motor vehicle parked in the sunshine, the temperature may rise to 60–70° C., and in baking the lacquer coat of motor vehicles an oven temperature of 90° C. is reached—the plastic elements become soft and conform to the internal shape of the clamping member so that the initial press fit is impaired and the plastic elements come loose.

One object of the present invention is to provide a strap fastening device of the type described above in which said drawback is eliminated.

Another object is to provide a strap fastening device which is easy to manufacture.

A more specific object in this connection is to provide a strap fastening device in which the elements forming the finger grips may be mounted without the use of tools merely by inserting said elements into the tubular clamping member.

According to the invention these and other objects are achieved by providing a strap fastening device comprising a frame, a tubular clamping member which is non-rotatably but slidably guided for movement in its transverse direction in said frame, elements of plastic material which are inserted in the ends of said clamping member to form finger grips for the manipulation of said clamping member, and form-closing engaging means on each of said elements on the part thereof which is inserted in the clamping member, said means allowing said elements to be inserted into the clamping member from opposite ends thereof but preventing by their interengagement said elements from being pulled apart and thereby extracted from the clamping member.

The inventive features outline above will become apparent from the following description in which reference is made to the accompanying drawing illustrating two embodiments of the invention, chosen by way of example. In the drawing.

Figure 1:
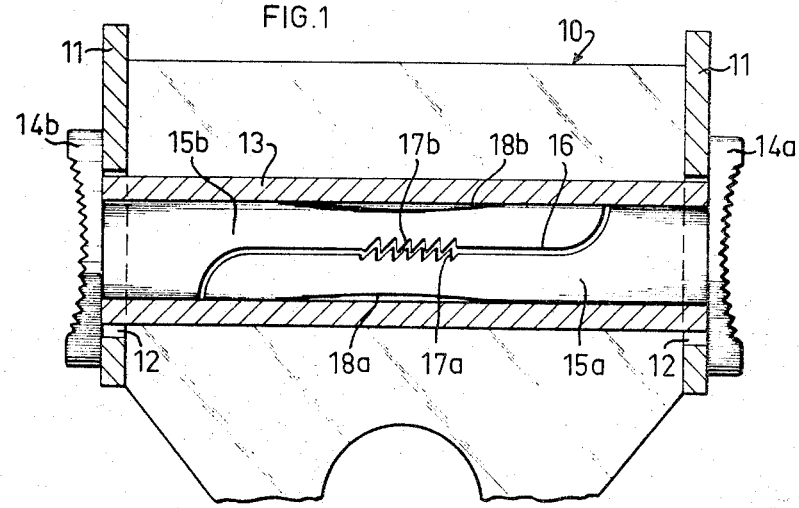
FIG. 1 is a longitudinal sectional view of a clamping member which is constructed in accordance with the invention and mounted in a fitting for fastening of a safety seat belt in a motor vehicle, the said belt being but fragmentarily shown.
Figure 2:
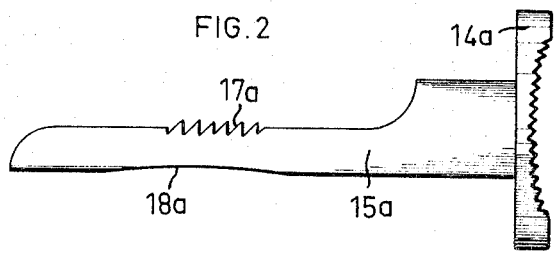
FIG. 2 is a side elevational view of one of the plastic elements in the clamping member.

The fitting fragmentarily shown in FIG. 1 is generally designated 10 and comprises two parallel flanges 11 having elongated apertures 12 in which a tubular clamping member 13 of oval cross-section is non-rotatable but slidable in its transverse direction toward and away from a stationary bar or like member (not shown). A strap (not shown) passed about the roller is adjustably retained in the fitting in that it is kept clamped between the clamping member and the bar. For adjusting the strap the clamping member must be moved away from the bar, and in order that this may be done easily and conveniently the clamping member has its ends provided with elements 14a and 14b of some suitable plastic material which form means to be operated with the fingers.

The elements 14a, 14b are retained in position in the clamping member 13 in a manner specific to the invention, and for this purpose they are preferably made from a resilient plastic material such as nylon or polyethylene. The elements each form one half 15a and 15b, respectively, of a plug substantially filling out the hollow interior of the clamping member 13, the surface of separation 16 between the two plug halves extending to a major portion substantially axially through the clamping member. Along part of said separating surface the plug halves are each provided with knurlings 17a and 17b, respectively. Said knurlings at least to a major part are in opposite relationship when the plug halves are inserted altogether into the clamping member, with the elements 14a and 14b forming the finger operated means being applied in the manner of heads against the end surfaces of the clamping member. The knurlings are so shaped as to slide over each other when the two plug halves are axially inserted in the hollow interior of the clamping member from opposite sides thereof, while said knurlings by their form-closing engagement prevent the plug halves from being moved apart and thus extracted from the clamping member once they have been inserted therein into mutual engagement. For this purpose, in the embodiment illustrated, the knurlings are inclined in one direction. In addition, each plug half is formed opposite to the knurling with a shallow recess 18a and 18b, respectively, on its side facing the interior of the clamping member to be able to yield when the knurlings are engaged with each other.

Figure 3:
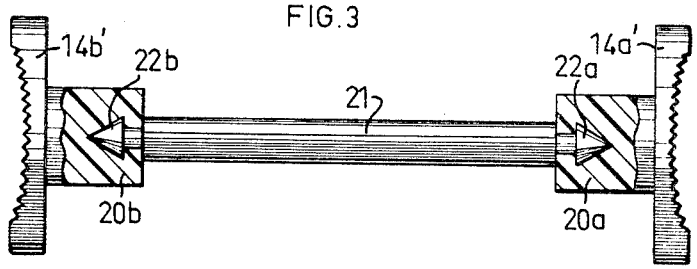
FIG. 3 is a view showing the essential details of a device according to the invention in a modified embodiment thereof.

In the embodiment illustrated in FIG. 3 the elements 14a' and 14b' forming the finger operated means are provided with studs 20a and 20b, respectively, fitting the clamping member (not shown in FIG. 3). A metal rod 21 is formed at ends with undercut pointed heads or bars 22a and 22b, respectively, and is inserted with these heads into corresponding recesses in the two studs. In this case the two elements are also kept togther by mutual form-closing engagement, which is, however, realised indirectly by the intermediary of the rod 21. Before the insertion of the elements 14a' and 14b' in the clamping member the rod 21 is first introduced into one element with the head at one end of said rod, whereafter said one element and the rod thereon are inserted in the clamping member. The other element is then introduced into the clamping member and pressed into engagement with the head at the free end of the rod.

In the embodiment according to FIG. 3 the rod 21 may be of some resilient material and the pins 20a and 20b substantially rigid. It will, however, be most advantageous to make the rod from metal and to make the elements 14a', 14b' and thus the studs 20a, 20b from resilient plastic material.

What I claim and desire to secure by Letters Patent is:

A strap fastening device comprising a frame, a tubular clamping member which is non-rotatably but slidably guided for movement in its transverse direction in said frame, elements inserted in the ends of said clamping member to form finger grips for the manipulation of said clamping member and each forming one half of a plug substantially filling the hollow interior of the clamping member, opposite knurled portions on said elements along a substantially axial part of the surfaces thereof facing each other in the interior of the clamping member, said portions forming inclined knurls allowing said elements to be inserted into the clamping member from opposite ends thereof by sliding over each other but preventing, by their interengagement, said elements from being pulled apart and thereby extracted from the clamping member, and a concavely curved surface portion on each said element opposite the knurled portion thereof and facing the hollow interior of the clamping member, said concavely curved surface forming a shallow recess enabling the plug halves to yield when the knurls slide over each other.

References Cited by the Examiner

UNITED STATES PATENTS

| | | | |
|---|---|---|---|
| 1,183,425 | 5/1916 | Ballou | 24—194 |
| 1,369,995 | 3/1921 | Webster | 85—4 |
| 1,416,892 | 5/1923 | Shields | 24—194 |
| 2,481,777 | 9/1949 | Overly | 85—4 |

WILLIAM FELDMAN, *Primary Examiner.*

E. SIMONSEN, *Assistant Examiner.*